United States Patent [19]

Nishimura et al.

[11] 4,028,237

[45] June 7, 1977

[54] METHOD AND APPARATUS FOR TREATMENT OF FLUORINE-CONTAINING WASTE WATERS

[75] Inventors: Shigeoki Nishimura; Toshio Sawa; Kouji Otani, all of Hitachi; Seiichi Kikkawa, Katsuta, all of Japan

[73] Assignee: Hitachi, Ltd., Tokyo, Japan

[22] Filed: Mar. 1, 1976

[21] Appl. No.: 662,615

[30] Foreign Application Priority Data

Feb. 28, 1975 Japan .............................. 50-23950

[52] U.S. Cl. .................................. 210/45; 210/53; 423/305; 423/319; 423/320; 423/321 R
[51] Int. Cl.² .......................................... C02B 1/20
[58] Field of Search .......... 423/301, 163, 158, 305, 423/490, 472, 464, 465, 127, 317, 319, 320, 315, 321, 166; 210/42, 51, 45, 47, 49, 53, 52

[56] References Cited

UNITED STATES PATENTS 3,671,189  6/1972  Betts .................................. 423/320
3,843,767  10/1974  Faust et al. ......................... 423/319

OTHER PUBLICATIONS

Chem. Abstract 82: 34776r; "Removal of Fluorine from Waste Waters." Line Addition and Effect of Aluminum Ions." Sekko To Sekkai (1974), 133, 216–221.
Chem. Abstract. 82: 102751f; "Physicochemical Purification of Water Containing Fluorine;" Trib. Cebedeau (1974); 27(371) 424–431.

Primary Examiner—Thomas G. Wyse
Assistant Examiner—Benoit Castel
Attorney, Agent, or Firm—Beall & Jeffery

[57] ABSTRACT

There are disclosed methods for removing fluorine values from fluorine-containing waste waters, in which aluminum ions are added to fluorine-containing waste water to convert fluorine to hydroxyfluoride complexes, adding phosphoric acid or phosphate and calcium compound are added to form fluoride apatite with residual fluorine in the waste water, and the hydroxyfluoride complex and fluoride apatite are removed from the waste water.

When waste water containing a phosphate in addition to fluorine is treated, the waste water is divided, according to the fluorine concentration, into concentrated waste water having a high fluorine concentration and dilute waste water having a low fluorine concentration; calcium compound is added to the concentrated waste water to form calcium fluoride, aluminum ions are added to the dilute waste water to form a hydroxyfluoride complex; the so treated dilute waste water is mixed with the phosphate-containing concentrated waste water from which the precipitated calcium fluoride has been removed, calcium compound is added to the mixture to form fluoride apatite, and the hydroxyfluoride complex and fluoride apatite are removed from the mixed waste water.

3 Claims, 9 Drawing Figures

METHOD AND APPARATUS FOR TREATMENT OF FLUORINE-CONTAINING WASTE WATERS

BACKGROUND OF THE INVENTION

The present invention relates to methods for the treatment of fluorine-containing waste waters.

As the conventional method for fixing and removing fluorine values from fluorine-containing waste waters, there is known a method for the treatment of fluorine-containing waste waters comprising adding calcium compound (such as slaked lime, limestone, gypsum or the like) to such waste water to cause reaction represented by the following formula (1):

$$Ca^{2+} + 2F^- \rightarrow CaF_2 \quad (1)$$

thus precipitating fluorine values in the waste water in the form of a hardly soluble salt, namely calcium fluoride, and separating this salt from the waste water.

According to this known method, however, it is impossible to reduce the fluorine concentration below about 8 ppm, and depending on the fluorine concentration in waste water to be treated, the amount added of $Ca^{2+}$ should be drastically increased. When the amount added of $Ca^{2+}$ is increased, the quantity of sludge is inevitably increased and unreacted $Ca^{2+}$ is often left in the treated waste water, causing undesired phenomena.

Recently, it is desired to reduce the fluorine concentration below 4 ppm or below 1 ppm in some special cases, and this desire cannot be satisfied at all by the above-mentioned conventional method comprising addition of a calcium compound.

The residual fluorine concentration in waste waters treated according to the conventional method using a calcium compound is shown in FIG. 1. As is seen from this FIG. 1, according to this conventional method, the residual fluorine concentration is reduced to about 8 ppm at lowest regardless of the initial fluorine concentration, and when the initial fluorine concentration in waste water to be treated is lower than 40 ppm, the amount added of $Ca^{2+}$ should rather be increased so as to lower the fluorine concentration to 8 ppm. This tendency is more conspicuous in the case of actual waste water practically discharged from an industrial plant, which contains various pollutants and substances in addition to fluorine, than in the case of model waste water containing fluorine alone, as shown in FIG. 2. Moreover, it is apparent that when the initial fluorine concentration is as low as about 10 ppm, even if $Ca^{2+}$ is added in great excess, calcium fluoride is not precipitated and fluorine in waste water is not removed at all.

As another method for fixing and removing fluorine values in waste waters, there has been proposed a method comprising addition of phosphoric acid or phosphate, the removal characteristics of which are shown in FIG. 3. Indeed, this method is effective for reducing the fluorine concentration, but phosphoric acid ions should be added in an amount of at least 3 moles per mole of the fluorine values in waste water to be treated. The reason is that the fluorine-fixing reaction in this method is a reaction forming fluoride apatite [$3Ca_3-(PO_4)_2 \cdot CaF_2$], which is represented by the following reaction formula (2):

$$10Ca^{2+} + 6PO_4^{3-} + 2F^- \rightarrow 3Ca_3(PO_4)_2 \cdot CaF_2 \downarrow \quad (2)$$

As is seen from the above reaction formula and experimental results shown in FIG. 3, in this known method using phosphoric acid or phosphate (addition of phosphoric acid ions), when the fluorine concentration is high in waste water to be treated, the amount added of the precipitating agent should be drastically increased.

In view of the foregoing state of the art, we made research works and as effective means for fixing and removing fluorine values in waste waters, we previously developed a method including addition of aluminum ions (addition of soluble aluminum salt or addition of aluminum ions by aluminum electrolysis). According to this method, aluminum ions are added to fluorine-containing waste water at pH 5 to 8 (the optimum pH range) to thereby fix fluorine in the waste water as a hardly soluble hydroxy-fluoride complex, and this complex is removed from the waste water. This method is effective as means for fixing and removing fluorine values. However, as is seen from FIG. 4, it was found that in order to reduce the residual fluorine concentration below 1 ppm, a considerably large amount of the aluminum ion should be added.

SUMMARY OF THE INVENTION

It is a primary object of the present invention to provide a method for treating fluorine-containing waste waters, according to which fluorine values are effectively removed from fluorine-containing waste water and the residual fluorine concentration can be greatly reduced.

Another object of the present invention is to provide a method for treating fluorine-containing waste waters, according to which, from waste water containing not only fluorine but also phosphate, both the fluorine and phosphate can be effectively removed and the residual fluorine concentration can be greatly reduced.

In accordance with one aspect of the present invention, aluminum ions are added to fluorine-containing waste water to convert fluorine values to hardly soluble complexes, phosphoric acid or phosphate and calcium compound are added to the waste water to form fluoride apatite with the residual fluorine in the waste water, and these complexes and apatite are removed from the waste water.

In accordance with another aspect of the present invention, waste water containing phosphate in addition to fluorine is divided into concentrated waste water and dilute waste water according to the fluorine concentration, calcium compound is added to the concentrated waste water to form calcium fluoride, aluminum ions are added to the dilute waste water to convert fluorine values to hardly soluble complexes both the waste waters are mixed, calcium ions are added to the mixture to form fluoride apatite, and the so formed complex and apatite are removed from the mixed waste water.

DETAILED DESCRIPTION OF THE PRESENTLY PREFERRED EMBODIMENTS

Figure 1:
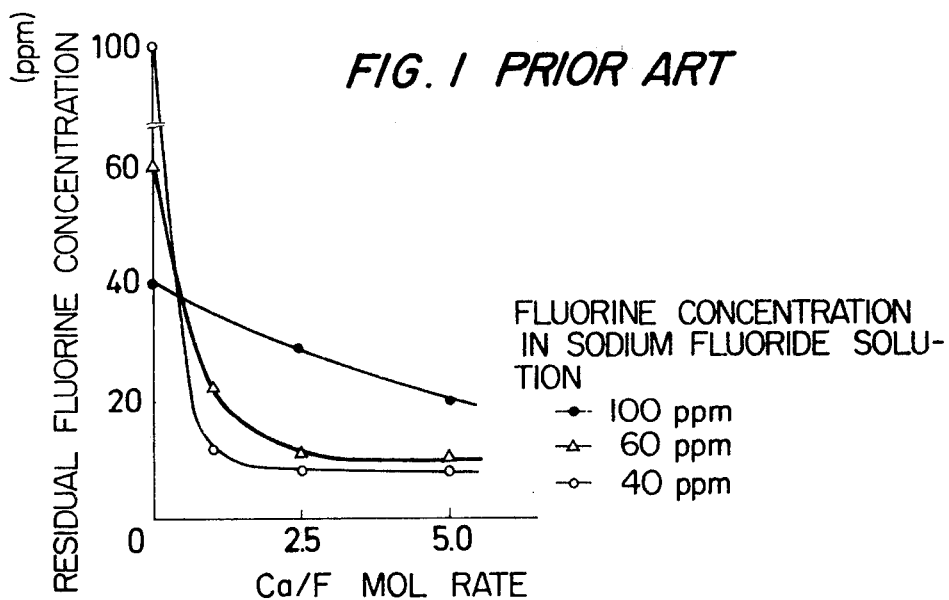
FIG. 1 illustrates the relation between the amount added of calcium and the residual fluorine concentration, which was obtained when sodium fluoride solutions having fluorine concentration of 100, 60 or 40 ppm were treated by addition of calcium.

In removing fluorine values from waste waters according to the present invention, there are adopted a first treatment for fixing fluorine as hydroxyfluoride complexes by adding aluminum ions to fluorine-containing waste water and a second treatment for converting the residual fluorine to fluoride apatite by adding phosphoric acid or phosphate and calcium compound. As the additional treatment, there is further adopted a treatment for removing the so formed hydroxy-fluoride complexes and fluoride apatite from the treated waste water. The first and second treatments need not be conducted definitely separately. It must be understood that the present invention includes as the main treatments the above-mentioned first and second treatments. Accordingly, it is permissible in the present invention to add a small amount of phosphoric acid at the first treatment or to form hardly soluble complexes by addition of aluminum ions at the second treatment. It must also be understood that even though calcium compound is not especially added together with phosphoric acid or phosphate, if calcium compound is added simultaneously with addition of the aluminum ion, for example, aluminum sulfate and it is left in the waste water, this corresponds to addition of the calcium compound in a chemical sense.

The present invention is further characterized in that phosphoric acid or phosphate contained in waste water is effectively utilized. More specifically, waste water containing fluorine and phosphoric acid or phosphate is divided into concentrated waste water and dilute waste water according to the fluorine concentration, calcium compound is added to the concentrated waste water to form calcium fluoride, which is then removed, and aluminum ions are added to the dilute waste water to convert fluorine to hydroxy-fluoride complexes, and the dilute waste water is mixed with the above concentrated waste water, from which the calcium fluoride has been removed but which still contains the phosphate, calcium compound is further added to the mixture to form a fluoride apatite and the above-mentioned hydroxy-fluoride complexes and fluoride apatite complex are removed from the waste water. In conducting this fluorine-containing waste water treatment method of the present invention, removal of the hydroxy-fluoride complexes and the fluoride apatite may be conducted simultaneously, or they may be removed independently just after they have been formed.

The present invention provides the following apparatus for practising the above waste water treatment method. More specifically, there is provided an apparatus for the treatment of fluorine-containing waste waters which comprises a first reaction tank communicated with a fluorine-containing waste water tank, an aluminum salt solution tank communicated with said first reaction tank, a pH adjuster disposed in said first reaction tank to adjust the amount of a pH adjusting agent charged from a pH adjusting agent tank, a second reaction tank communicated with said first reaction tank, a phosphoric acid or phosphate solution tank communicated with said second reaction tank to charge phosphoric acid or phosphate into said second reaction tank, a pH adjuster disposed in said second reaction tank to adjust the amount of a pH adjusting agent charged from a pH adjusting agent tank, and a precipitation tank communicated with said second reaction tank to effect solid-liquid separation to thereby remove fluorine from the waste water.

One embodiment of the present invention will now be described by reference to the accompanying drawings.

Figure 5:
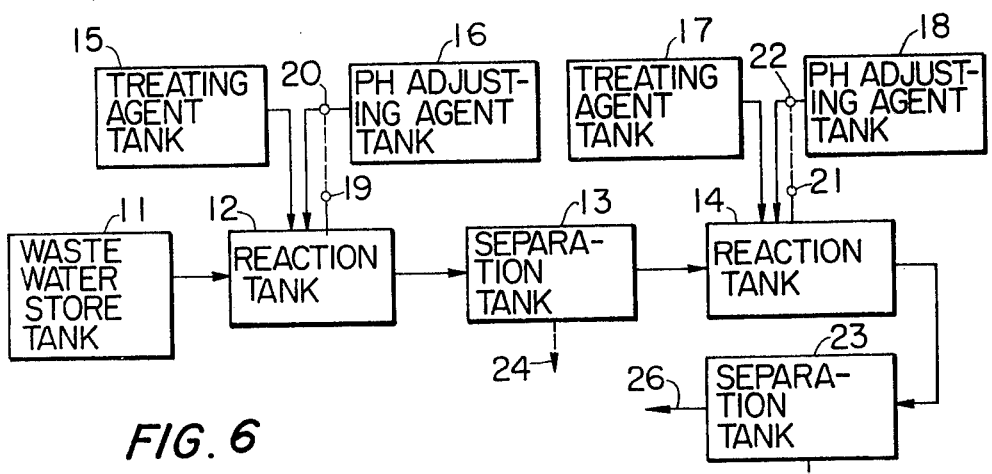
FIG. 5 is a flow sheet illustrating one embodiment of the fluorine-containing waste water treatment method of the present invention.

FIG. 5 is a block diagram showing the flow of steps for practising the method of the present invention. Fluorine-containing waste water stored in a waste water store tank 11 is transferred into a first reaction tank 12. A soluble aluminum salt (such as aluminum sulfate, aluminum chloride, aluminum nitrate or the like) in an amount sufficient to reduce the fluorine concentration to about 10 ppm is incorporated into the reaction tank 12 from a treating agent tank 15. An acid or alkali is incorporated from a pH adjusting agent tank 16 by using a pH adjuster 19 disposed in the reaction tank 12 and a pH control pump 20 co-operative with the pH adjuster, so that the reaction is conducted at pH 5 to 8. The residence time in the reaction tank 12 is about 30 minutes, and hardly soluble hydroxy-fluoride complexes such as $Al(OH)_2F$, $Al(OH)F_2$ or the like is formed. Then, the waste water is fed to a separation tank 13, where the sludge composed of said complex, excessive aluminum salt and the like is separated from the treated waste water which still contains a reduced amount of fluorine as the residual fluorine. The sludge is taken out through a passage 24 and the treated waste water is fed to a second reaction tank 14. Phosphoric acid or soluble phosphate and calcium compound are added in suitable amounts into the second reaction tank 14 from a treating agent tank 17, and an acid or alkali is incorporated into the second reaction tank 14 from a pH adjusting agent tank 18 to maintain the pH at 6 to 8. More specifically, a pH adjuster 21 is disposed in the second reaction tank 14 to measure the pH of the waste water in the second reaction tank 14, and the pH adjuster 21 is operated according to the measured pH value to actuate a pH control pump 22 to adjust the amount added of the acid or alkali. The residence time in the second reaction tank 14 is about 30 minutes, and a fluoride apatite is formed by the reaction in the second reaction tank 14. Then, the treated waste water is fed to a separation tank 23, where the hardly soluble hydroxy-fluoride complex and fluoride apatite in the treated waste water are precipitated and the precipitate is taken out through a passage 25, while the treated water is taken out as harmless treated water through a passage 26 and it is used again.

Figure 6:
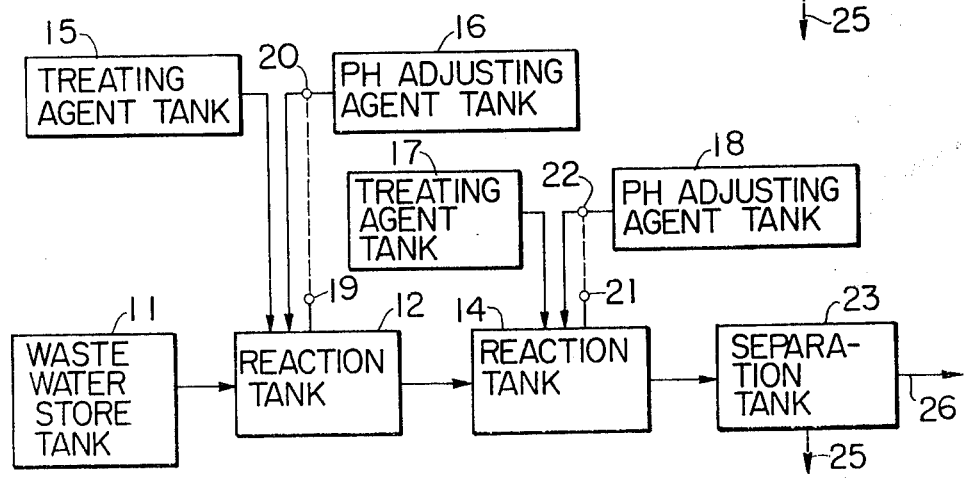
FIG. 6 is a flow sheet illustrating another embodiment of the fluorine-containing waste water treatment method of the present invention.
Figure 7:
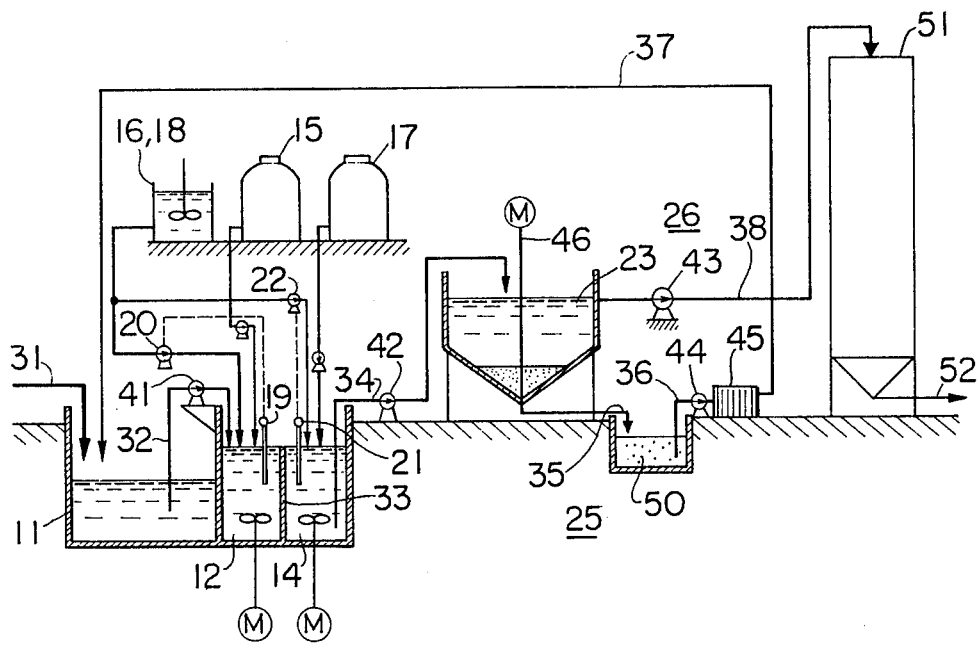
FIG. 7 is a diagram illustrating the waste water treatment apparatus for practising the embodiment shown in FIG. 6.

The embodiment shown in FIG. 6 is substantially identical with the embodiment shown in FIG. 5. Accordingly, members having similar functions are denoted by the same reference numerals as used in FIG. 5. The embodiment of FIG. 6 is different from the embodiment of FIG. 5 only in the point that the separation tank 13 is omitted and the waste water from the first reaction tank 12 is fed to the second reaction tank 14 without the sludge being removed therefrom. Accordingly, the sludge separated at the separation tank 23 is a precipitate including the hardly soluble hydroxy-fluoride complex and fluoride apatite. The embodiment of FIG. 6 is detailed in FIG. 7 illustrating the apparatus for practising this embodiment. In FIG. 7, members having the same functions as in FIG. 6 are denoted by the same reference numerals as used in FIG. 6. Fluorine-containing waste water is transferred into a waste water tank 11 through a conduit 31 and stored in this tank 11. The waste water from the waste water tank 11 is transferred into a first reaction tank 12 through a conduit 32 by a pump 41 to form hardly soluble hydroxy-fluoride complexes. The hardly soluble complex-containing waste water is overflown beyond a dam 33 into a second reaction tank 14 where fluoride apatite is formed in the same manner as described hereinbefore. Then, the waste water containing the hardly soluble complex and fluoride apatite is transferred into a separation tank 23 through a conduit 34 by a pump 42. In this tank 23, the hardly soluble complex and fluoride apatite are precipitated and stored in the bottom portion. A scraper 46 is disposed so that the sludge is prevented from adhering to the wall of the separation tank 23. The sludge is withdrawn from a hole formed on the bottom of the tank 23, and transferred and stored into a concentrated sludge tank 50 through a conduit 35. A filter press 45 is disposed to further treat this sludge. The sludge fed to the filter press 45 from the sludge tank 50 through a conduit 36 is subjected to solid-liquid separation. The liquid portion is transferred to the waste water store tank 11 through a conduit 37 and stored in the tank 11. The treated water separated at the separation tank 23 is fed to a filtration tank 51 through a conduit 38 by a pump 43, and other substances contained in the treated water are removed in this tank 51 and purified water is taken out through a conduit 52.

Another embodiment of the waste water treatment capable of reducing the fluoride concentration and the phosphoric acid concentration below 4 ppm and 1 ppm, respectively, in waste water containing phosphoric acid or a phosphate in addition to fluorine, will now be described by reference to FIG. 8.

Figure 8:
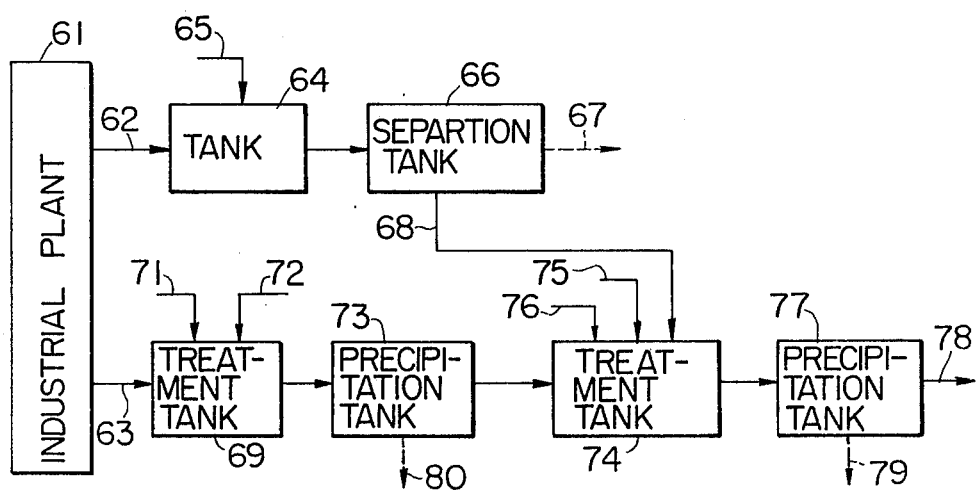
FIG. 8 is a flow sheet illustration still another embodiment of the present invention in which waste water containing not only fluorine but also phosphoric acid is treated.

In FIG. 8, waste water discharged from an industrial plant 61, which contains fluorine and phosphoric acid, is divided, according to the fluorine concentration, into concentrated waste water 62 containing fluorine in an order of percents and dilute waste water 63 which is an ordinary waste water having a fluorine concentration of 50 to several hundred ppm. For example, the fluorine (HF) concentration in the concentrated waste water 62 is 2% and the $H_3PO_4$ concentration is 2%. The fluorine concentration in the dilute waste water 63 is about 100 ppm. The concentrated waste water 62 is transferred to a fractional fixing tank 64, and a calcium compound, for example, $CaCO_3$, is incorporated into the tank 64 through a passage 65, whereby $CaF_2$ is formed and the fluorine in the waste water is fixed and removed. Then, the waste water containing $CaF_2$ is transferred to a solid-liquid separation tank 66 and the $CaF_2$ sludge is taken out through a passage 67. Then, the waste water containing the residual fluorine and phosphoric acid or phosphate is transferred through pipe 68 to a second treatment tank 74, which will be detailed hereinafter.

The dilute waste water 63 is transferred to a first treatment tank 69 to which an aluminum salt is added through a passage 71 and calcium compound such as $Ca(OH)_2$ or NaOH is added through a passage 72. In this treatment tank 69, hardly soluble hydroxy-fluoride complexes is formed from the aluminum ion and fluorine to thereby fix and separate the fluorine in the waste water. The hardly soluble complex-containing waste water is transferred to a sedimentation and precipitation tank 73, and the sludge is withdrawn through a passage 80. The so treated waste water (which still contains about 10 ppm of the residual fluorine) is then transferred to the second treatment tank 74, into which the waste water containing the residual fluorine and phosphoric acid or phosphate, which is formed by the above treatment of the concentrated waste water, is similarly introduced through a passage 68 as described above. Additional phosphoric acid is supplied into this tank 74 through a passage 75, and calcium compound such as $Ca(OH)_2$ is similarly introduced. Accordingly, fluoride apatite is formed as described above and the phosphoric acid component in the waste water is fixed and separated in this tank 74. The fluoride apatite-containing waste water is then transferred to a sedimentation and precipitation tank 77 where solid-liquid separation is conducted. The sludge is withdrawn through a passage 79 and the treated water is withdrawn through a passage 78. In this embodiment, the fluorine concentration and phosphoric acid concentration can easily be reduced below 4 ppm and 1 ppm, respectively.

Figure 9:
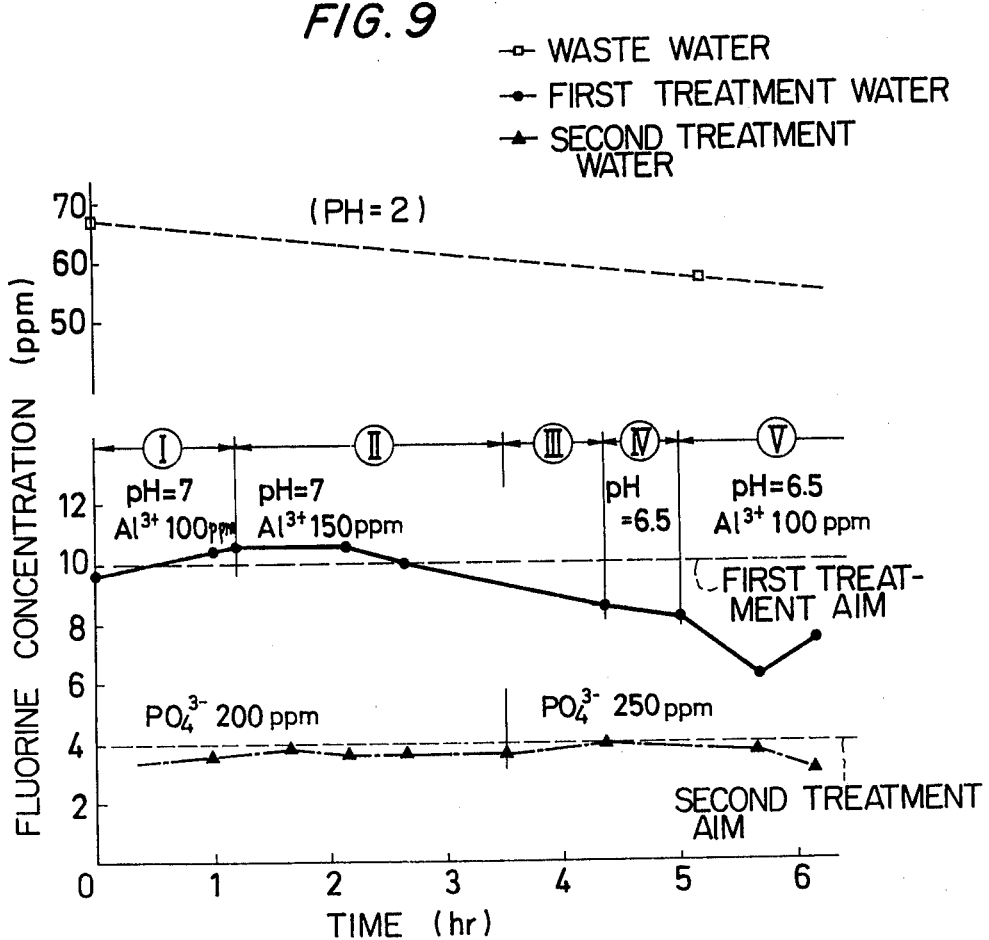
FIG. 9 is a view showing the residual fluorine concentration obtained when waste water containing 70 ppm of fluorine was treated according to the waste water treatment method of the present invention.

FIG. 9 illustrates results of the waste water treatment according to the model plant. As will be apparent from these results, when waste water containing about 70 ppm of fluorine is treated according to the present invention, the fluorine concentration can be reduced to about 10 ppm by the first treatment, and the fluorine concentration in the final treated water can be reduced below 4 ppm by the apatite-forming second treatment. Thus, it is confirmed that the present invention is very effective for the treatment of fluorine-containing waste waters.

The present invention will now be described in detail by reference to the following Examples.

EXAMPLE 1

Figure 2:
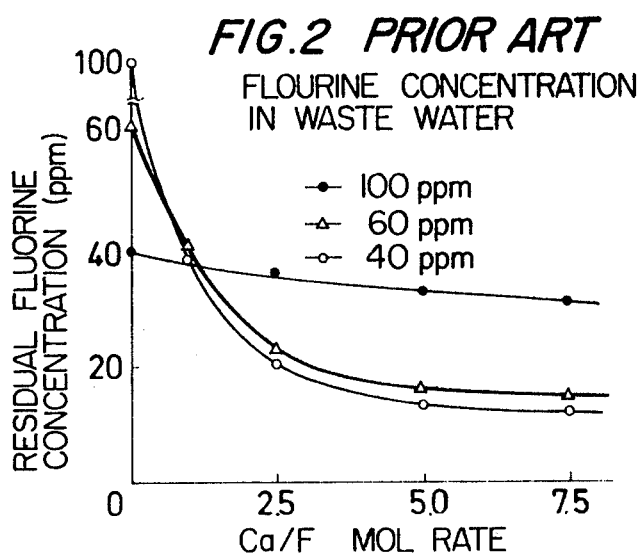
FIG. 2 illustrates the relation between the amount added of calcium and the residual fluorine concentration, which was obtained when waste waters having fluorine concentration of 100, 60 or 40 ppm we were treated by addition of calcium.
Figure 3:
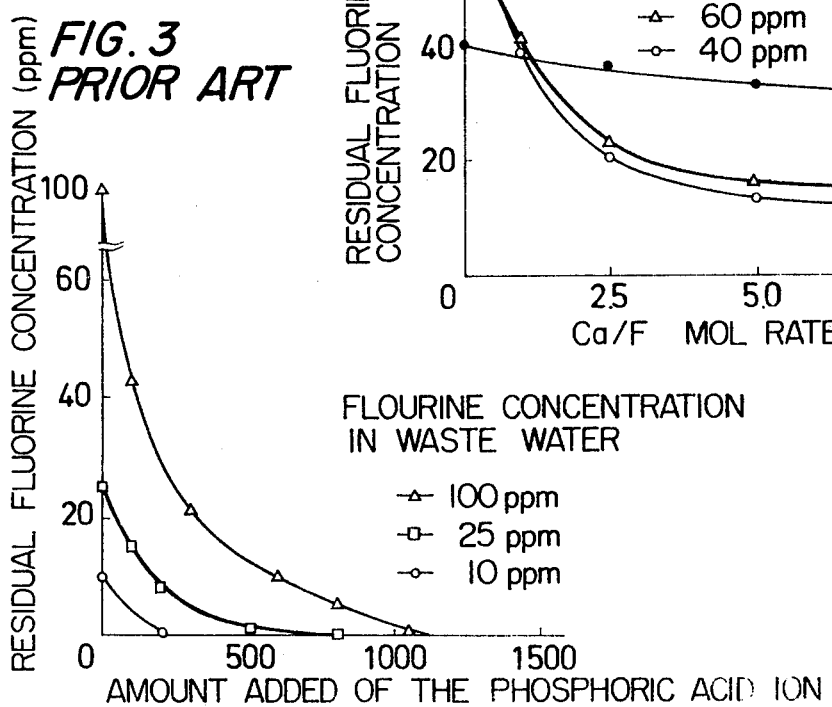
FIG. 3 illustrates the relation between the amount added of the phosphoric acid ion and the residual fluorine concentration, which was obtained when waste waters having fluorine concentration of 100, 25 or 10 ppm were treated by addition of phosphoric acid.
Figure 4:
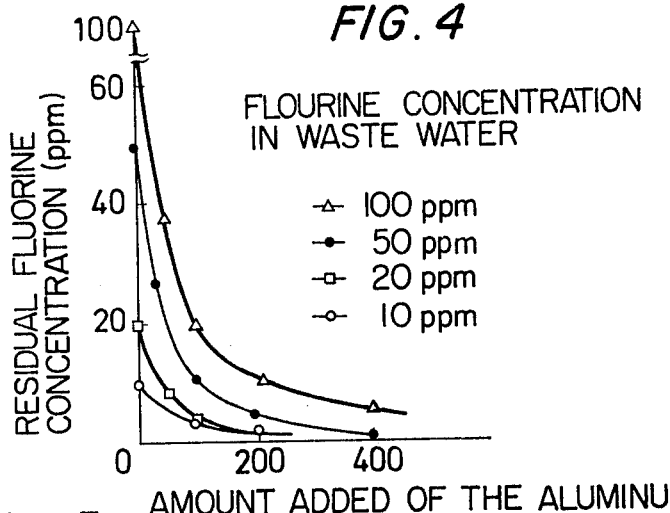
FIG. 4 illustrates the relation between the amount added of the aluminum ion and the residual fluorine concentration, which was obtained when waste waters having a fluorine concentrations of 100, 50, 20 or 10 ppm were treated by addition of aluminum ions.

The waste water treatment was conducted according to the embodiment shown in FIG. 5. Waste water having a fluorine concentration of 40 ppm was fed to the waste water store tank 11. As is apparent from the results shown in FIG. 2, fluorine values cannot be substantially removed from this waste water by addition of calcium salt. The waste water was fed to the first reaction tank 12 at a rate of 100 l/h, and aluminum sulfate was fed to the reaction tank 12 from the treating agent tank 15 at a rate of 12 g/h as calculated as the aluminum ion. The pH was adjusted to 6.0 by addition of NaOH to effect reaction in the tank 12. Then, the waste water was subjected to solid-liquid separation in the separation tank 13. The fluorine concentration in the treated water was 7.5 to 10.5 ppm. Then, the treated waste water was fed to the second reaction tank 14, and calcium chloride and phosphoric acid were incorporated into the liquid at rates of 40 g/h and 20 g/h, respectively, from the treating agent tank 17. The pH was adjusted to 6.5 to 7.5 by addition of slaked lime and the reaction was conducted. The treated waste water was fed to the separation tank 23 and harmless treated water was recovered. The residual fluorine concentration was always maintained below 0.8 ppm.

COMPARATIVE EXAMPLE 1

The waste water treatment was conducted by the one-staged treatment method using phosphoric acid. In order to obtain an effect equivalent to the effect obtained in Example 1, it was necessary to feed 80 g/h of phosphoric acid and 150 g/h of calcium chloride while maintaining the pH at 6.5 to 7.5.

The waste water treatment was conducted by the one-staged treatment method using an aluminum salt. In order to reduce the fluorine concentration below 1 ppm, it was necessary to feed the aluminum salt at a rate of 40 g/h, as calculated as the aluminum ion, which was about 4 times the amount of the aluminum salt used in Example 1.

EXAMPLE 2

The waste water treatment was conducted according to the embodiment shown in FIG. 5. Waste water containing 82 ppm of fluorine, which has been stored in the waste water tank 11, was fed to the first reaction tank 12 at a rate of 100 l/h, and an aqueous solution of aluminum chloride was fed to the reaction tank 12 from the treating agent tank 16 at a rate of 23 g/h as calculated as the aluminum ion. The pH was adjusted to 5.5 to 6.5 by addition of NaOH and the reaction was conducted. The slurry was directly fed to the second reaction tank 14, to which calcium chloride and phosphoric acid were added at rates of 40 g/h and 20 g/h, respectively. The pH was adjusted to 6.5 to 7.5 by addition of NaOH and the reaction was conducted. The slurry was fed to the separation tank 23 to effect solid-liquid separation, and harmless treated water was recovered. The residual fluorine concentration in the treated water was 0.6 to 1.2 ppm. Thus, it was confirmed that fluorine values can be removed assuredly by the two-staged treatment method of the present invention.

As is apparent from the foregoing illustration, according to the present invention, the amounts of treating chemicals used can be greatly reduced by treating waste waters in two stages, and therefore, the amount of the sludge can be reduced. Further, the residual fluorine concentration in the treated water can be reduced to a very low level.

What is claimed is:

1. A method for treating fluorine-containing waste waters to remove fluorine values therefrom, which comprises adding aluminum ions to fluorine-containing waste waters at pH 5 to 8 to convert a portion of said fluorine values to hydroxy-fluoride complexes, adding phosphate ions and calcium ions to the waste water at pH 6 to 8 to form fluoride apatite with the residual fluorine that has not been converted to said complexes, and removing said hydroxy-fluoride complexes and fluoride apatite from the treated water.

2. A method for treating fluorine and phosphate-containing waste waters to remove fluorine values therefrom, which comprises dividing waste water containing fluorine and phosphate into concentrated waste water and dilute waste water according to the fluorine concentration, adding a calcium compound to the concentrated waste water at pH 2 to 3 to form calcium fluoride, removing the so formed calcium fluoride, adding aluminum ions to the dilute waste water at pH 5 to 8 to convert fluorine values to hydroxy-fluoride complexes, mixing the so treated dilute waste water with the concentrated waste water, from which calcium fluoride has been removed but which still contains the phosphate to form fluoride apatite adding calcium compound to the mixture to form fluoride apatite, and removing said hydroxy-fluoride complexes and fluoride apatite from the treated water.

3. A method according to claim 2, wherein the step of adding the calcium compound to said mixture is at pH 6 to 8.

* * * * *